United States Patent
Furmanski

(10) Patent No.: US 10,717,673 B2
(45) Date of Patent: *Jul. 21, 2020

(54) POLYMER FIBERS FOR CONCRETE REINFORCEMENT

(71) Applicant: ExxonMobil Research and Engineering Company, Annandale, NJ (US)

(72) Inventor: Jevan Furmanski, Califon, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/170,457

(22) Filed: Oct. 25, 2018

(65) Prior Publication Data

US 2019/0062210 A1 Feb. 28, 2019

Related U.S. Application Data

(63) Continuation-in-part of application No. 14/983,771, filed on Dec. 30, 2015, now Pat. No. 10,131,579.

(51) Int. Cl.
| | |
|---|---|
| C04B 16/06 | (2006.01) |
| C04B 20/00 | (2006.01) |
| C04B 20/02 | (2006.01) |
| C04B 7/02 | (2006.01) |
| C04B 7/34 | (2006.01) |
| C04B 40/00 | (2006.01) |
| C04B 28/02 | (2006.01) |
| C04B 103/00 | (2006.01) |
| C04B 103/12 | (2006.01) |
| C04B 103/61 | (2006.01) |
| C04B 111/34 | (2006.01) |
| C04B 111/20 | (2006.01) |
| C04B 111/50 | (2006.01) |

(52) U.S. Cl.
CPC ............ C04B 16/0633 (2013.01); C04B 7/02 (2013.01); C04B 7/34 (2013.01); C04B 16/0625 (2013.01); C04B 20/006 (2013.01); C04B 20/02 (2013.01); C04B 28/02 (2013.01); C04B 40/0039 (2013.01); C04B 2103/0052 (2013.01); C04B 2103/0062 (2013.01); C04B 2103/0088 (2013.01); C04B 2103/12 (2013.01); C04B 2103/61 (2013.01); C04B 2111/29 (2013.01); C04B 2111/343 (2013.01); C04B 2111/50 (2013.01); C04B 2235/3418 (2013.01)

(58) Field of Classification Search
CPC ............ C04B 16/0633; C04B 16/0625; C04B 20/006
See application file for complete search history.

(56) References Cited

U.S. PATENT DOCUMENTS

| | | | |
|---|---|---|---|
| 3,887,530 A | 6/1975 | O'Farrell et al. | |
| 4,132,556 A | 1/1979 | Camprincoli et al. | |
| 4,255,540 A | 3/1981 | Weiss | |
| 4,306,911 A | 12/1981 | Gordon et al. | |
| 4,310,478 A | 1/1982 | Balslev et al. | |
| 4,410,586 A | 10/1983 | Ladizesky et al. | |
| 4,710,540 A | 12/1987 | McAlphin et al. | |
| 4,801,630 A | 1/1989 | Chow et al. | |
| 4,861,812 A | 8/1989 | McAlphin et al. | |
| 4,952,631 A | 8/1990 | McAlphin et al. | |
| 4,997,289 A | 3/1991 | Sasaki et al. | |
| 5,399,195 A | 3/1995 | Hansen et al. | |
| 5,502,160 A | 3/1996 | Modrak | |
| 5,705,233 A | 1/1998 | Denes et al. | |
| 5,753,368 A | 5/1998 | Berke et al. | |
| 5,817,415 A | 10/1998 | Chou et al. | |
| 5,940,863 A | 8/1999 | Fimoff et al. | |
| 6,001,476 A | 12/1999 | Selivansky | |
| 6,069,192 A | 5/2000 | Shalaby et al. | |
| 6,308,777 B2 | 10/2001 | Chatterji et al. | |
| 6,569,233 B2 | 5/2003 | Macklin et al. | |
| 6,649,671 B2 | 11/2003 | Pyzik et al. | |
| 6,844,065 B2 | 1/2005 | Reddy et al. | |
| 6,969,423 B2 | 11/2005 | Li et al. | |
| 7,204,879 B2 | 4/2007 | Zucker | |
| 8,785,526 B2 | 7/2014 | Bassetti et al. | |
| 9,249,052 B2 | 2/2016 | Kawakami | |
| 2002/0192449 A1 | 12/2002 | Hobbs et al. | |
| 2003/0056694 A1 | 3/2003 | Macklin et al. | |
| 2006/0078729 A1 | 4/2006 | Yabuki et al. | |
| 2006/0159904 A1 | 7/2006 | Zucker | |
| 2006/0188719 A1 | 8/2006 | Selivansky | |
| 2006/0234048 A1 | 10/2006 | Dallies et al. | |
| 2015/0038618 A1 | 2/2015 | Kawakami | |
| 2017/0190616 A1 | 6/2017 | Furmanski | |

FOREIGN PATENT DOCUMENTS

| | | |
|---|---|---|
| CN | 1273952 A | 11/2000 |
| CN | 1405369 A | 3/2003 |

(Continued)

OTHER PUBLICATIONS

Shen, "New development of Chinese fiber reinforced cement based composites", Guisuanyan Tongbao, 2005, pp. 55-59, vol. 24, iss. 5, Guisuanyan Tongbao Bianjibu. (English Abstract).

(Continued)

*Primary Examiner* — Wenwen Cai

(74) *Attorney, Agent, or Firm* — Kristina Okafor

(57) ABSTRACT

Provided are cementitious mixtures and processes for reinforcing a cementitious matrix. In one form of the process for reinforcing a cementitious matrix includes the steps of mixing a mineral cement and one or more populations of synthetic copolymer microfibers including about 1 mol. % to about 25 mol. % and from about 75 mol. % to about 99.5 mol. % of propylene monomeric units.

35 Claims, No Drawings

(56) References Cited

FOREIGN PATENT DOCUMENTS

| | | | |
|---|---|---|---|
| CN | 1406900 A | 4/2003 | |
| CN | 1407148 A | 4/2003 | |
| CN | 1834050 A | 9/2006 | |
| CN | 1915889 A | 2/2007 | |
| CN | 1915890 A | 4/2007 | |
| CN | 101481606 A | 7/2009 | |
| CN | 101525453 A | 9/2009 | |
| CN | 101525779 A | 9/2009 | |
| CN | 103668550 A | 3/2014 | |
| DE | 145921 A1 | 1/1981 | |
| DE | 3210693 A1 | 10/1983 | |
| DE | 3341462 A1 | 5/1985 | |
| EP | 0081265 A1 * | 6/1983 | ......... C04B 16/0625 |
| EP | 1044939 A1 | 10/2000 | |
| GB | 2021552 A | 12/1979 | |
| JP | 64033036 A | 2/1989 | |
| JP | 1160850 A | 6/1989 | |
| JP | 06135755 A | 5/1994 | |
| JP | 07010620 A | 1/1995 | |
| JP | 10280279 A | 4/1997 | |
| JP | 2000061925 A | 8/1998 | |
| JP | 11255544 A | 9/1999 | |
| JP | 11350246 A | 12/1999 | |
| JP | 3394738 B2 | 3/2000 | |
| JP | 2000203918 A | 7/2000 | |
| JP | 2001040575 A | 2/2001 | |
| JP | 2001058858 A | 3/2001 | |
| JP | 3295408 B2 | 6/2002 | |
| JP | 4279016 B2 | 3/2003 | |
| JP | 2003160365 A | 6/2003 | |
| JP | 4397252 B2 | 2/2004 | |
| JP | 2004059385 A | 2/2004 | |
| JP | 2004059389 A | 2/2004 | |
| JP | 2004137119 A | 5/2004 | |
| JP | 2004168643 A | 6/2004 | |
| JP | 2004168645 A | 6/2004 | |
| JP | 2004175574 A | 6/2004 | |
| JP | 3570603 B2 | 9/2004 | |
| JP | 2006096565 A | 4/2006 | |
| JP | 2006151792 A | 6/2006 | |
| JP | 3980762 B2 | 9/2007 | |
| JP | 4005276 B2 | 11/2007 | |
| JP | 4021556 B2 | 12/2007 | |
| JP | 4116704 B2 | 7/2008 | |
| JP | 4860828 B2 | 1/2012 | |
| JP | 4970675 B2 | 7/2012 | |
| RU | 2165399 C1 | 4/2001 | |
| SK | 201150034 A3 | 3/2013 | |
| SK | 201150035 A3 | 3/2013 | |
| WO | 8704144 A1 | 7/1987 | |
| WO | 8902879 A1 | 4/1989 | |
| WO | 9420654 A1 | 9/1994 | |
| WO | 9919268 A1 | 4/1999 | |
| WO | 03022774 A1 | 3/2003 | |
| WO | 03027038 A1 | 4/2003 | |
| WO | 2004033770 A1 | 4/2004 | |
| WO | 2005105696 A2 | 11/2005 | |
| WO | 2006016499 A1 | 2/2006 | |
| WO | 2007000086 A1 | 1/2007 | |
| WO | 2013166568 A1 | 11/2013 | |
| ZA | 8702484 A | 2/1988 | |

OTHER PUBLICATIONS

Chou et al., "On Improving PP Reinforced Cement-Based Composite", Advanced Science Letters, 2012, pp. 382-386, vol. 13, American Scientific Publishers.
Chou et al., "On the Improvement of Fiber Reinforced Concrete through Surface Modification of Polypropylene by Grafting Method", Advanced Materials Research, 2011, pp. 1693-1696, vols. 194-196, Trans Tech Publications.
Hild et al., "Plasma-treated ultra-high-strength polyethylene fibres improved fracture toughness of poly (methyl methacrylate)", Journal of Materials Science: Materials in Medicine, 1993, pp. 481-493, vol. 4, Chapman & Hall.
Zhang et al., "Plasma Treatment of Polymeric Fibers for Improved Performance in Cement Matrices", Journal of Applied Polymer Science, 2000, pp. 1985-1996, vol. 76, John Wiley & Sons, Inc.
Feldman et al., "Polypropylene fiber-matrix bonds in cementitious composites", Journal of Adhesion and Science Technology, Jun. 27, 2000, pp. 1705-1721, vol. 14, iss. 13, Taylor & Francis Group.
Ma et al., "Polypropylene fiber modified by surface cross-linking in dielectric barrier discharge", Surface & Coatings Technology, 2007, pp. 4935-4938, vol. 201, Elsevier.
Rashitov, "Polypropylene fibers for concrete reinforcement", Tsement i Ego Primenenie, 2007, pp. 56-57, vol. 5, OOO "Zhurnal Tsement". (English Abstract).
He et al., "Progress of polypropylene fibre reinforced concrete", Huagong Xinxing Cailiao, 2013, pp. 130-132, vol. 41, iss. 3, Huagong Xinxing Cailiao Bianjibu. (English Abstract).
Wang et al., "Progress of the Surface Modification of PP Fiber Used in Concrete", Polymer-Plastics Technology and Engineering, 2006, pp. 29-34, vol. 45, iss. 1, Taylor & Francis Group.
Ju et al., "Properties and application of polypropylene fiber in concrete", Hecheng Xianwei Gongye, 2004, pp. 35-37, vol. 27, iss. 1, Yueyang Shiyou Huagong Zhongchang Yanjiuyuan. (English Abstract).
Fu et al., "Property of polypropylene fiber and its application in cement", Huaxue Gongye Yu Gongcheng, 2004, pp. 457-460, vol. 21, iss. 6, Huaxue Gongye Yu Gongcheng Bianjibu. (English Abstract).
Johnston, "Proportioning, mixing and placement of fibre-reinforced cements and concretes", Production Methods and Workability of Concrete: Proceedings of the International RILEM Conference, Paisley, Scotland, Jun. 3, 1996, pp. 155-179, E&FN Spon.
Zhou et al., "Research progress and application of polypropylene fiber used in concrete", Xiandai Suliao Jiagong Yingyong, 2006, pp. 62-64, vol. 18, iss. 1, Zhongguo Shihua Jituan Gongsi Suliao Jiagong Yingyong Qingbao Thongxinzhan. (English Abstract).
Yang et al., "Silica modified PP fiber for improving crack-resistance of cementitious composites", Advanced Materials Research, 2011, pp. 2058-2064, vols. 332-334, Trans Tech Publications.
"State-of-the-Art Report on Fiber Reinforced Shotcrete", Concrete International, ACI Committee 506, Dec. 1984, pp. 15-27, vol. 6, iss. 12.
Chen et al., "Status and application of synthetic fiber reinforced concrete in China", Jianzhu Cailiao Xuebao, 2001, pp. 167-173, vol. 4, iss. 2, Jianzhu Cailiao Xuebao Bianjibu. (English Abstract).
Chou et al., "Studies on improving PP finer reinforced concrete", Advanced Materials Research, May 17, 2011, pp. 678-681, vols. 250-253, Trans Tech Publications.
Zhang et al., "Study on interface bonding of PP fiber-cement and antishrinkage performance", Jianzhu Cailiao Xuebao, 2001, pp. 17-21, vol. 4, iss. 1, Jianzhu Cailiao Xuebao Bianjibu. (English Abstract).
Sobolev et al., "Superhydrophobic Engineered Cementitious Composites for Highway Bridge Applications: Phase II", National Center for Freight & Infrastructure Research & Education, Jun. 2013, University of Wisconsin, Milwaukee.
Li et al., "Surface modification of polypropylene fibers by chemical grafting methods to reinforce the interfacial bonding of cement-based composites", Fuhe Cailiao Xuebao, 2013, pp. 238-244, vol. 30, iss. 4, Fuhe Cailiao Xuebao Bianjibu. (English Abstract).
Tu et al., "Surface modified polypropylene fibres for use in concrete", Magazine of Concrete Research, 1998, pp. 209-217, vol. 50, iss. 3, ICE Publishing.
Lopez-Buendia et al., "Surface treated polypropylene (PP) fibres for reinforced concrete", Cement and Concrete Research, 2013, pp. 29-35, vol. 54, Elsevier.
Ogihara et al., "Surface treatment on polypropylene fibers by sol-gel method and effect of coating on the concrete strength", Semento, Konkurito Ronbunshu, 2000, pp. 141-146, vol. 54, Semento Kyokai. (English Abstract).
Ogihara et al., "Surface treatment on polypropylene fibers by sol-gel method and effect of coating on the concrete strength", Sen'i Kogyo

(56) References Cited

OTHER PUBLICATIONS

Kenkyu Kyokai Hokoku, 2001, pp. 19-22, vol. 11, Sen'i Kogyo Kenyu Kyokai. (English Abstract).

Romero-Sanchez et al., "Surface treatments of polypropylene fibres (PP) to improve adhesion to concrete", Proceedings of the Annual Meeting of the Adhesion Society, 2007, 30th, pp. 251-253, AIDICO Technical Institute of Construction.

Pei et al., "Surface Treatments of Subdenier Monofilament Polypropylene Fibers to Optimize Their Reinforcing Efficiency in Cementitious Composites", Journal of Applied Polymer Science, 2004, pp. 2637-2641, vol. 92, Wiley Periodicals, Inc.

Zheng et al., "Synthetic fibre-reinforced concrete", Progress in Polymer Science, 1995, pp. 185-210, vol. 20, iss. 2, Elsevier.

Ostertag et al., "Tensile strength enhancement in interground fiber cement composites", Cement & Concrete Composites, 2001, pp. 419-425, vol. 23, Elsevier.

Wang, Y., "Toughness characteristics of synthetic fibre-reinforced cementitious composites", Fatigue & Fracture of Engineering Materials & Structures, 1998, pp. 521-532, vol. 21, Blackwell Science Ltd.

Peled et al., "Treatments of polypropylene fibres to optimize their reinforcing efficiency in cement composites", Cement & Concrete Composites, 1992, pp. 277-285, vol. 14, Elsevier.

Tu et al., "Wettability of surface fluorinated polypropylene fibres and its effect on interfacial bonding with cementitious matrix", Proceedings of the International Conference on Composite Science and Technology, Jul. 1996, Durban, South Africa.

Tu et al., "Wettability of Surface Oxyfluorinated Polypropylene Fibres and Its Effect on Interfacial Bonding with Cementitious Matrix", Journal of Adhesion, 1997, pp. 187-211, vol. 62, Overseas Publishers Association.

Felekoglu et al., "A comparative study on the flexural performance of plasma treated polypropylene fiber reinforced cementitious composites," Journal of Materials Processing Technology, 2009, pp. 5133-5144, vol. 209, Elsevier.

Yang et al., "Application of nano-silica modified fiber in cementitious materials," Dongnan Daxue Xuebao, Ziran Kexueban, 2010, pp. 49-55, vol. 40, iss. 2, Dongnan Daxue Xuebao, Ziran Kexueban Bianjibu. (English Abstract).

Guerrini, "Applications of High-Performance Fiber-Reinforced Cement-Based Composites," Applied Composite Materials, 2000, pp. 195-207, vol. 7, Kluwer Academic Publishers.

Li et al., "A Review of Steel-polypropylene Hybrid Fiber Reinforced Concrete," Applied Mechanics and Materials, 2012, pp. 26-32, vol. 238, Trans Tech Publications.

Denes et al_, "Cementitious-matrix composites from SiCl4-plasma-activated polypropylene fibers," Journal of Adhesion Science and Technology, 1996, pp. 61-77, vol. 10, iss. 1.

Fahmy et al., "Chemical Treatments of Polypropylene Fiber Surfaces Used in Fiber Reinforced Concretes," Transportation Research Record, 1989, pp. 31-35, iss. 1226.

Strand et al., "Construction Applications of Polyolefin Fiber Reinforces Concrete," Materials for the New Millennium, Proceedings of the Fourth Materials Engineering Conference, 1996, Washington D.C., Materials Engineering Division of the American Society of Civil Engineers.

Tatnall et al., "Developments and applications of high performance polymer fibres in shotcrete," Proceedings of the International Conference on Engineering Developments in Shotcrete, Hobart, Tasmania, 2001.

Mishra, "Differential Scanning Calorimetric Studies of Plypropylene for Fibre Reinforced Concrete," Journal of the Institution of Chemists, 2005, pp. 157-160, vol. 77, iss. 5.

Cun et al., "Dispersing agent of polypropylene ultra-short fiber reinforced concrete," Journal of Southeast University (Natural Science Edition), 2010, pp. 96-101 vol. 40, iss. 2. (English Abstract).

Zheng et al., "Effect of coupling agent combined with modified calcium carbonate on the performance of the UHMWPE fiber and its cement mortar," Hunningtu, 2013, pp. 132-135, vol. 11, iss. 138, Hunningtu Bianjibu. (English Abstract).

Nekkaa et al., "Effect of Fiber Content and Chemical Treatment on the Thermal Properties of Spartium junceum Fiber-Reinforced Polypropylene Composites," International Journal of Polymeric Materials and Polymeric Biomaterials, Jun. 24, 2008, pp. 771-784, vol. 57, iss. 8, Taylor & Francis Group.

Li et al., "Effect of inclining angle, bundling and surface treatment on synthetic fibre pull-out from a cement matrix," Composites, Mar. 1990, pp. 132-140, vol. 21, No. 2, Butterworth & Co Ltd.

Li et al., "Effect of modified polypropylene fiber on mechanical properties of cement mortar," Jianzhu Cailiao Xuebao, 2010, pp. 135-138, vol. 13, iss. 2, Jianzhu Cailiao Xuebao Bianjibu. (English Abstract).

Li et al., "Effects of modified polypropylene fibers on properties of foamed cement," Fuhe Cailiao Xuebao, 2013, pp. 14-20, vol. 30, iss. 3, Fuhe Cailiao Xuebao Bianjibu. (English Abstract).

Li et al., "Effect of Plasma Treatment of Polyethylene Fibers on Interface and Cementitious Composite Properties", Journal of the American Ceramic Society, 1996, pp. 700-704, vol. 79, iss. 3, Blackwell Publishing.

Payrow et al., "Effect of surface treatment on the post-peak residual strength and toughness of polypropylene/polyethylene-blended fiber-reinforced concrete", Journal of Composite Materials, 2011, pp. 2047-2054, vol. 45, iss. 20, Sage.

Tu et al., "Effects of the increased fibre surface wettability on the polypropylene fibre-concrete interfacial bonding and the properties of the polypropylene fibre reinforced concrete," Second International RILEM Symposium on Adhesion between Polymers and Concrete, Sep. 14, 1999, Dresden, Germany.

Wu et al., "Fiber/cement interface tailoring with plasma treatment", Cement & Concrete Composites, 1999, pp. 205-212, vol. 21, Elsevier.

Thomas, "Fibre composites as construction materials", Composites, 1972, pp. 62-64, Iliffe Science and Technology Publications.

Gray, "Fiber-matrix bonding in steel fiber-reinforced cement-based composites", Fracture Mechanics of Ceramics, 1986, pp. 143-155, vol. 7, Plenum Press.

Lankard, "Fiber Reinforced Cement-Based Composites", Ceramic Bulletin, 1975, pp. 272-276, vol. 54, iss. 3, American Ceramic Society.

Swamy, "Fibre reinforcement of cement and concrete", Materiaux et Constructions, 1975, pp. 235-254, vol. 8, iss. 45, Chapman & Hall.

Kopkane et al., "Improvement of Mechanical Properties of Mortar Reinforced by Cold Plasma Treated Polypropylene Fibres", Advanced Science Letters, 2013, pp. 429-432, vol. 19, American Scientific Publishers.

Ke et al., "Improving the Interfacial Mechanical Property of Fiber Reinforced Cement with Dielectric Barrier Discharge 2: Morphological and Compositional Changes of the Fiber Surface", Journal of Dong Hua University, 2001, pp. 32-37, vol. 18, iss. 1.

Novak et al., "Influence of surface modification on adhesive properties of polypropylene", Chemicke Listy, 1992, pp. 672-680, vol. 86, iss. 9. (English Abstract).

Xing et al., "Influence of surface treatment of synthetic macro-fiber on strength of cement mortar", Guangxi Daxue Xuebao, Ziran Kexueban, 2013, pp. 1003-1008, vol. 38, iss. 4,Guangxi Daxue Xuebao Bianjibu. (English Abstract).

Ding et al., "Influence of the surface modification on the properties of polypropylene fibers", Hunningtu, 2008, pp. 59-62, vol. 12, Hunningtu Bianjibu. (English Abstract).

Li et al., "Interface Property Characterization and Strengthening Mechanisms in Fiber Reinforced Cement Based Composites", Advanced Cement Based Materials, 1997, pp. 1-20, vol. 6, iss. 1, Elsevier.

Li et al., "Interface Property Tailoring for Pseudo Strain-Hardening Cementitious Composites", Engineering Application of Fracture Mechanics, 1995, pp. 261-268, vol. 14.

Gao et al., "Interfacial optimization of PP fiber reinforced cement composite treated by plasma", Jianzhu Cailiao Xuebao, 2001, pp. 79-83, vol. 4, iss. 1, Jianzhu Cailiao Xuebao Bianjibu. (English Abstract).

Zhang et al., "Latest research progress on polypropylene fiber cement-based material", Zhongguo Jiancai Keji, 2012, pp. 72-75, vol. 21, iss. 1, Zhongguo Jiancai Keji Zazhishe. (English Abstract).

(56) References Cited

OTHER PUBLICATIONS

Shah et al., "Mechanical Behavior of Fiber-Reinforced Cement-Based Composites", Journal of the American Ceramic Society, 1991, pp. 2727-2738 and 2947-2953, vol. 74, iss. 11, Blackwell Publishing.

Ning et al., "Modification of Polypropylene Fibers by Acrylic Acid and Its Influence on the Mechanical Property of Cement Mortar", Advanced Materials Research, 2011, pp. 1459-1462, vols. 168-170, Trans Tech Publications.

Tosun et al., "Multiple cracking response of plasma treated polyethylene fiber reinforced cementitious composites under flexural loading", Cement & Concrete Composites, 2012, pp. 508-520, vol. 34, Elsevier.

Katz, "Effect of Fiber Modules of Elasticity on the Long Term Properties of Micro-fiber Reinforced Cementitious Composites", Cement and Concrete Composites, Jan. 1, 1996, pp. 389-399, vol. 18, No. 6, Elsevier.

International Search Report and Written Opinion PCT/US2016/068500 dated May 12, 2017.

* cited by examiner

POLYMER FIBERS FOR CONCRETE REINFORCEMENT

CROSS-REFERENCE TO RELATED APPLICATIONS

This application is a continuation-in-part of U.S. application Ser. No. 14/983,771 filed Dec. 30, 2015, which is herein incorporated by reference in its entirety. This application claims the benefit under 35 USC 120 of U.S. application Ser. No. 14/983,771

FIELD

This disclosure relates to concrete mixtures containing microfibers as ductile reinforcement against the propagation microscopic cracks through the concrete mixtures and to processes of reinforcing concrete matrices by incorporating microfibers into the concrete pre-mixture.

BACKGROUND

Concrete lifetime, durability, and toughness is limited by its resistance to the formation and coalescence of microscopic cracks in the Portland cement. These are exacerbated by freeze-thaw cycles and water intrusion/migration. By itself, concrete has a limited local fracture resistance owing to little energy being consumed by damage in the volume of material around a brittle failure.

Fibrous reinforcement may be used for improving the physical properties of cement and concrete structures, such as for the production of pipes, corrugated boards, roofing slates, machine foundations, storage tank walls, reactors, aircraft runways, roads, pilings and many other high strength articles.

Of the fibers currently used for cement reinforcement, polyacrylonitrile and polyvinyl alcohol fibers are preferred because they combine high fiber strength with good adhesion to a cement matrix. Unfortunately, both are expensive materials and significantly increase the cost of producing fiber reinforced cement structures. A variety of other less-expensive materials have been considered for production of cement reinforcement fibers.

Steel fibers have been tried and found inadequate because they suffer from chemical attack by the alkaline environment of curing cement. Glass and polyester fibers also degrade due to the alkaline environment of the curing cement matrix. Other polymers, including polyethylene and polypropylene homopolymers, copolymers, or terpolymers have been explored, as have various surfactants for fiber coating. Additionally, fibers made from polymer alloys have been suggested.

However, despite recent advances, there remains an unmet need in the art to optimize concrete with reinforcing fibers which are able to help reduce the formation and propagation of microscopic cracks in concrete.

An embodiment described in examples herein provides a cementitious mixture that includes a mineral cement, and a first population of microfibers. The first population of microfibers includes a first synthetic copolymer including from about 1 mol. % to about 25 mol. % ethylene monomeric units and from about 75 mol. % to about 99.5 mol. % of propylene monomeric units.

Another embodiment described in examples herein provides a process reinforcing a cementitious matrix. The process includes adding a first population of microfibers to a mineral cement to form a cementitious pre-mixture. The first population microfibers includes a first synthetic copolymer that includes from about 1 mol. % to about 25 mol. % of ethylene monomeric units and from about 75 mol. % to about 99.5 mol. % of propylene monomeric units.

Another embodiment described in examples herein, provides a cementitious mixture that includes a mineral cement, a first population of microfibers, and a second population of microfibers. The first population of microfibers includes a first synthetic copolymer that includes from about 1 mol. % to about 25 mol. % of ethylene monomeric units and from about 75 mol. % to about 99.5 mol. % of propylene monomeric units. The second population of microfibers includes a second synthetic copolymer that includes from about 1 mol. % to about 25 mol. % of one of ethylene or propylene monomeric units, and from about 75 mol. % to about 99.5 mol. % of the other of propylene or ethylene monomeric units.

DETAILED DESCRIPTION

Examples described herein provide a reinforced cementitious matrix, such as a reinforced concrete, and a process for formulating such a matrix. The reinforced cementitious matrix includes a mineral cement, and a population of microfibers formed from a first synthetic copolymer. In one example, the synthetic copolymer includes from about 1 mole percent (mol. %) to about 25 mol. % of ethylene monomeric units and about 75 mol. % to about 99.5 mol. % of propylene monomeric units. Commercial polymers may be used to form the microfibers, for example, including the Vistamaxx™ family of propylene-based polymers, available from the Exxon Mobil Corporation, such as grades 3020FL and 3588FL, among others.

As used herein, mineral cements are inorganic materials which when combined with water can bind other materials together. Suitable mineral cements for use in the presently disclosed compositions include Portland cements, pozzolan-lime cements, slag-lime cements, supersulfated cements, calcium sulfoaluminate cements and any other natural cements. Mineral cements may contain a wide variety of inorganic compounds, including $SiO_2$, $Al_2O_3$, $Fe_2O_3$, $CaO$, $MgO$ and $SO_3$, most or all of which are ionic species in the presence of the water added to cure the cement. Additionally, cement mixtures can reach very alkaline pH, even as high as pH 13 or more.

The presently disclosed cementitious mixtures can be mixed in the dry or wet states, and can be further mixed with conventional additives, including one or more of sand, fly ash, fine aggregates, coarse aggregates, blast furnace slag, pozzolans, fumed silica, wetting agents, air entrainers, air detrainers, corrosion inhibitors, set accelerators, or set retarders, or any combinations thereof, depending upon the desired applications for the cured concrete product. These materials and procedures for forming cementitious mixtures are known to those of ordinary skill in the art. For example, as used herein, a fine aggregate is a mineral substance with a longest dimension less than about 5 mm, such as sand, while a coarse aggregate is a mineral substance with a longest dimension greater than about 10 mm, such as gravel.

In various examples, multiple populations of microfibers are used as reinforcement in this cementitious matrix. In these examples, in addition to a population of microfibers formed from the first synthetic copolymer, a second population of microfibers includes a second synthetic copolymer that includes from about 1 mol. % to about 25 mol. % of one of ethylene or propylene monomeric units, and from about 75 mol. % to about 99.5 mol. % of the other of propylene or ethylene monomeric units.

Numerous other monomeric units may be included in the synthetic copolymers, for example, to improve the adhesion of the synthetic copolymers to the concrete matrix, the strength of the microfibers, and the like. In various examples, one or more of the synthetic copolymers includes a diene monomer, such as dicyclopentadiene, norbornene, ethylidene norbornene, or vinyl norbornene, among others. Commercial polymers that may be used in embodiments include polymers from the Vistalon™ family of EPDM polymers, available from the Exxon Mobil Corporation. These may include grades such as Vistalon™ 2502, Vistalon™ 3666, and Vistalon™ 8600, among numerous others.

In examples that include multiple populations of microfibers, the physical properties of the individual synthetic copolymers used to make different populations of microfibers can be selected to improve the overall temperature resistance of the reinforced cementitious matrix. In some examples, a first population of microfibers having a first Vicat softening temperature is included with a second population of microfibers having a second Vicat softening temperature, wherein the two Vicat softening temperatures are separated by at least about 10° C. and measured using the same techniques and conditions. As used herein, the Vicat softening point may be measured using ASTM D1525 with a weight of 200 g. The test determines the point at which a point load penetrates a sample to a measured depth, such as one millimeter.

Other polymers can be blended with the synthetic copolymers used to form the microfibers to modify the physical and thermal properties. In an example, a polyethylene that includes between about 0.5 mol. % and about 5 mol. % of a comonomer is blended with one of the synthetic copolymers used to form the microfibers. The comonomer may include 1-butene, 1-hexene, or 1-octene, or any combinations thereof. Commercial polymers that may be used in include linear low-density polyethylene (LLDPE) polymers available from Exxon Mobil Corporation, such as polymers from the LL 3201 series, from the LL 1236 series, and LL 5100.09, among many others. In some examples, a low-density polyethylene (LDPE) may be used. Commercial polymers that may be used in these examples include polymers from the LD 103 series, polymers from the LD 105 series, and polymers from the LD 117 series, available from the Exxon Mobil Corporation, among many others. Further, low density polyethylenes that include vinyl acetate as a comonomer (EVA) may also be used. Examples of these are available from the Exxon Mobil Corporation as the LD 302 series, the LD 306 series, and the LD 312 series, among others. The use of the vinyl acetate as a comonomer provides a polar group that may be functionalized during curing to provide ionic cross-link points, as described herein.

As described herein, the optimization of the fiber properties and loading can be ascertained by well-known testing methods. Further, the loading may be varied based upon the chemical and physical nature of the microfibers selected for inclusion and the desired characteristics of the wet or cured concrete.

All numerical values within the detailed description and the claims herein are modified by "about" or "approximately". This accounts for experimental error and variations that would be expected by a person having ordinary skill in the art.

Each of the following terms written in singular grammatical form: "a," "an," and "the," as used herein, may also refer to, and encompass, a plurality of the stated entity or object, unless otherwise specifically defined or stated herein, or, unless the context clearly dictates otherwise. For example, the phrases "a device," "an assembly," "a mechanism," "a component," and "an element," as used herein, may also refer to, and encompass, a plurality of devices, a plurality of assemblies, a plurality of mechanisms, a plurality of components, and a plurality of elements, respectively.)

Each of the following terms: "includes," "including," "has," "having," "contains", "containing", "comprises," and "comprising," and, their linguistic or grammatical variants, derivatives, and/or conjugates, as used herein, means "including, but not limited to."

Throughout the illustrative description, the examples, and the appended claims, a numerical value of a parameter, feature, object, or dimension, may be stated or described in terms of a numerical range format. It is to be fully understood that the stated numerical range format is provided for illustrating implementation of the forms disclosed herein, and is not to be understood or construed as inflexibly limiting the scope of the forms disclosed herein.

Moreover, for stating or describing a numerical range, the phrase "in a range of between about a first numerical value and about a second numerical value," is considered equivalent to, and means the same as, the phrase "in a range of from about a first numerical value to about a second numerical value," and, thus, the two equivalently meaning phrases may be used interchangeably.

It is to be understood that the various forms disclosed herein are not limited in their application to the details of the order or sequence, and number, of steps or procedures, and sub-steps or sub-procedures, of operation or implementation of forms of the method or to the details of type, composition, construction, arrangement, order and number of the system, system sub-units, devices, assemblies, sub-assemblies, mechanisms, structures, components, elements, and configurations, and, peripheral equipment, utilities, accessories, and materials of forms of the system, set forth in the following illustrative description, accompanying drawings, and examples, unless otherwise specifically stated herein. The apparatus, systems and methods disclosed herein can be practiced or implemented according to various other alternative forms and in various other alternative ways.

It is also to be understood that all technical and scientific words, terms, and/or phrases, used herein throughout the present disclosure have either the identical or similar meaning as commonly understood by one of ordinary skill in the art, unless otherwise specifically defined or stated herein.

Phraseology, terminology, and, notation, employed herein throughout the present disclosure are for the purpose of description and should not be regarded as limiting.

Concrete lifetime, durability, and toughness is limited by its resistance to the formation and coalescence of microscopic cracks in the mineral cement, such as Portland cement. According to the present disclosure, strong and ductile copolymer microfibers are added to a cementitious mixture, such as concrete, to improve local energy dissipation and, thus, decrease crack propagation in the cured concrete. The energy dissipation is accomplished with a combination of crystal plasticity, amorphous network extension and strength, and polar molecule addition or fiber surface treatment for improved adherence to or in the host mineral phase. High pH that evolves during cement curing may convert some polar groups to salts, which have an affinity to the host mineral phase. Applications for this microfiber reinforced concrete include performance structures (blast-proof), long-life infrastructure, prefabricated civil structures (bridge supports), and to enhance downhole cement curing integrity and blowout prevention.

Inclusion of the polymer microfibers into the cementitious material allows the fibers to intersect a nascent or propagating crack and "bridge" it, such that the fibers both dissipate energy with crack opening, and also bear load, which takes the driving force for propagation away from the crack tip. This is similar to the fracture toughness of bone, in which brittle hydroxyapatite mineral structure is reinforced by a collagen fiber matrix, allowing collagen fibers to bridge cracks. Current concrete reinforcing fibers have high tensile strength, but are relatively brittle, as they are generally highly crystalline. Relatively lower crystallinity polymers may be used for concrete reinforcement to provide a balance of strength properties, wherein the microfibers form from the polymers have good tensile strength, but also good ductility. The ductility may inhibit breakage of the microfibers during the stress imparted by microscopic cracking of concrete both during curing and subsequently during stresses induced during use, such as from vehicular traffic in a road surface application.

In various examples, the microfibers are formed from functionalized polymers, or treated, to enhance their adherence to the mineral phase and to transmit stress without pulling out under local tension. This may be performed by including reactive monomers in the polymerization, such as the ethylene vinyl acetate (EVA) polymers described herein. Blends of these materials may preferentially express the reactive groups at the surface. In various examples, the polar groups are derived from monomeric units that include alpha, beta-unsaturated carboxylic acids, or anhydrides, or unsaturated organic sulfonic acids, or their salts, or ester derivatives.

Further, functional sites may be created by chemically treating the fibers to form exposed polar groups on the surfaces, increasing the affinity for the host mineral phase. An example of a chemical treatment that may be used to form functional groups at the surface of a polymer structure is reaction of the surface with chromic acid, or other strong acids, to attack methyl groups, or other hydrocarbon groups along the surface of the polymer. Further, photochemical reactions may be used to functionalize the surface of the polymer.

In addition to these techniques, a mild oxidation of the polymer surface may be used to provide functional groups on the surface. The oxidation techniques may include corona treatment, plasma treating, or flame treatment, among others. Corona treatment uses a low temperature corona, or electrical, discharge to oxidize the surface of a polymer. In various examples, the microfibers would be formed and then passed under the electric discharge to oxidize an outer layer.

Other oxidation techniques may be used. For example, plasma treating or flame treating may be used oxidize the surface. Plasma treating uses a gas plasma that may be generated by a DC current, a radiofrequency current, or microwave power. The plasma is applied over the surface, for example, of fibers passed under plasma jets. Similarly, flame treatment uses ionized gaseous oxygen generated through jet flames to add polar functional groups while slightly melting the surface molecules.

The microfibers can be formed using melt spinning or any other fiber spinning technique which is suitable for making fibers having diameters less than about 1 mm. Spinning is a specialized extrusion process that forces the melted polymer through a die termed a spinneret. As the fibers leave the spinneret, they may be drawn to the chosen diameter, and collected on a spool for later treatment to form the functional groups, or may be chopped into smaller links, and treated later. The fibers may be formed by other techniques, such as fiber blowing techniques in which the polymer melt is forced through a spinneret into a gas or air stream, which both rips the fiber from the spinneret and draws the fiber to length.

Suitable fiber diameters can be less than about 1 millimeter (mm), or less than about 0.5 mm (500 µm), or less than about 100 µm, such as from about 10 µm to about 100 µm, or from about 20 µm to about 60 µm. In various examples, the spun microfibers, which are generally continuous when spun, are chopped into smaller fibers, since longer microfibers may ball-up during the process of mixing of the wet concrete and will not reinforce as fibers. However, if they are too short, they will not bridge cracks. Accordingly, the chopped fibers will have an aspect ratio (i.e. length/diameter) which is optimized to have both adequate length to bridge microscopic cracks in concrete and adequate diameter to impart sufficient resistance to balling up or otherwise bending. The optimum aspect ratio will depend on the polymer chemistry and the level of crystallinity of the polymer microfibers so-formed. In various examples, the aspect ratio may be about 5:1, about 10:1, about 25:1, or about 50:1. The microfibers can be formed, stored and shipped as nonwoven fabrics, and subsequently chopped into suitable staple fiber lengths at the location of mixing or use.

The polymers used to form the microfibers have at least some level of crystallinity, but not high enough crystallinity to render the microfibers brittle. The measurement of the % crystallinity may be performed using differential scanning calorimetry (DSC), for example, using ASTM F 2625 for determining % crystallinity of a polyethylene polymer. In a typical procedure, approximately 10 mg of a sample is cut from a test specimen and accurately weighed. The test specimen may be placed in a sample container, such as a crimped aluminum pan, and placed in the instrument. A purge gas, such as nitrogen or argon, may be added to displace any oxygen over the sample. A 10° C. per minute heating rate may be used to heat the sample to above approximately 30° C. over the melting temperature of the polymer, while measuring heat flow versus temperature. A cooling cycle at approximately the same rate then cools the polymer below the recrystallization temperature. The energy of the heats of fusion and heats of crystallization may be determined by integrating the areas under the peaks. A % crystallinity may then be determined by comparison of these values to standard values for 100% crystallinity. Typical values for 100% crystalline heat of fusion for polyethylene is about 290 J/g, and for PP crystallinity about 177 J/g.

In various examples, the polymers used to form the microfibers may have less than about 5% crystallinity, less than about 15% crystallinity, less than about 30% crystallinity, less than about 45% crystallinity, or less than about 60% crystallinity. The selection of the crystallinity is made by the balance between the strength of the polymer versus the ductility. Accordingly, the crystallinity of the polymers forming the microfibers may be chosen so that the microfibers will have some ductility, which acts to resist fiber breakage upon application of the tensile forces incurred in the curing concrete matrix, as well as those incurred subsequent to curing due to loading of the concrete surface, such as that applied to a road surface by vehicular traffic. In this way, even if microscopic cracks are formed, the reinforcing microfibers will survive the cracking and reduce propagation of the microscopic cracks.

It is advantageous if the microfibers are formed from a polymer having a ductility greater than about 25%, greater than about 50%, or greater than about 75%, depending on the application. Mixtures of microfibers made from synthetic copolymers having widely separated ductility, for example, about 25% ductility and about 50% ductility may be beneficial. In an example, the microfibers are formed from a polymer having a ductility of about 50%. The ductility may be measured by strain to failure. Strain to failure, also known as elongation at break, is measured along with other tensile properties, generally using one of two ASTM tests, ASTM D 638 for unreinforced and reinforced plastics, or ASTM D 412 for elastomers.

ASTM D 638 is run using a dog bone or dumbbell shaped test specimen that has wider ends for clamping in the measurement device and a narrow center portion that is uniform in width between the wider ends. The wider ends are clamped by tensile grips, and then an extensometer, or other device, may be used to measure the change in length of the narrow center portion. During the test the tensile grips are pulled apart at a constant rate of speed. The speed depends on the specimen shape and can range from about 0.05 in./min. to about 20 in./min. depending on the specimen shape. Once the sample ruptures, the test is ended. Usually, five test specimens are sequentially measured to allow sample averaging. The physical properties obtained from the test include tensile strength, elongation at yield, elongation at break (nominal strain at break, or grips separation), modulus of elasticity, secant modulus, and, using a transverse extensometer, Poisson's ratio. The temperature the test is run at is generally ambient, or about 20° C. (68° F.).

Similar to ASTM D 638, ASTM D 412 is run using a dog bone or dumbbell shaped test specimen. In this case, the test specimen is cut out of a sheet of the material, for example, with the dumbbell shaped punch or die. The sample is loaded into a testing machine using a pair of tensile grips that are suitable for elastomers, and an extensometer may be attached to measure the elongation of the narrow center portion. The test is run by pulling the tensile grips apart at a known rate, where the rate is determined by the specific material being tested. Charts of rates are available in the specification. The physical properties obtained from the test include stress at a specified elongation, tensile yield stress, tensile yield strain, tensile strength or rupture, and elongation at rupture. As for ASTM D 638, generally five test specimens are sequentially measured to allow sample averaging. The temperature the test is run at is generally ambient, or about 20° C. (68° F.).

The crystallinity of the synthetic polymers used to form the microfibers described herein, may provide improvements over microfibers form from amorphous polymers, which can break when drawn by the tensile forces of the concrete matrix. In contrast, some level of crystallinity allows the microfibers of the present disclosure to dissipate the energy imparted by the cracking concrete matrix without breaking. Further, the low crystallinity may increase the breaking resistance when stretched to a near maximum elongation.

The microfibers useful in the presently disclosed cementitious mixtures can be spun from any copolymer which has at least some low level of crystallinity, as described herein. By "copolymer" is meant a polymer which is composed of at least two or more comonomer components. The copolymers can be two-component polymers (di-polymers), or even three-component polymers (terpolymers), or the like. The copolymers are synthetic, formed by polymerization of the selected monomer components, or even by modification of naturally occurring polymers. Examples of such copolymers include random or non-random ethylene or propylene copolymers comprising from about 0.5 mol. % to about 25 mol. %, or from about 1 mol. % to about 10 mol. %, or from about 2 mol. % to about 8 mol. %, or even from about 3 mol. % to about 7 mol. % of one of ethylene or propylene monomeric units, and from about 75 mol. % to about 99.5 mol. % of the other.

The crystallinity of these copolymers can be "tuned" or selected, if commercial polymers are used, to be within a desired range, such as from about 1% to about 60%, even from about 5% to about 45%, or even from about 10% to about 30%, as measured by DSC, as described herein, by varying the ratio of the ethylene and/or propylene co-monomers or other backbone defects such as tacticity or branching. Alternatively, a low crystallinity copolymer can be formed by copolymerizing ethylene or propylene with an alpha, beta-unsaturated carboxylic acid or anhydride, such as maleic acid or maleic anhydride, which acts to reduce the normally high-level crystallinity of polyolefin, in addition to providing a functional group.

Advantageously, the copolymers of the present disclosure are formulated such that the microfibers formed therefrom have exposed polar groups having chemical affinity with minerals present in curing or cured cementitious mixtures. For example, the spun microfibers can be plasma-treated, as described herein, to form polar groups, such as hydroxyl groups, on the surfaces thereof. In some examples, the polymers can be formulated to include repeating units of at least two different monomer compounds, wherein at least one of the monomer compounds has terminal polar groups. Such polar group-containing monomers include the above-mentioned alpha, beta-unsaturated carboxylic acids or anhydrides, such as maleic acid or maleic anhydride, or unsaturated organic sulfonic acids, or their salts or ester derivatives. The polar group-containing monomers can be selected to have both hydrophobic and hydrophilic moieties, such as where the molecules have a hydrophobic (non-polar) moiety on one end and a hydrophilic (polar) moiety on the other end. When copolymerized with relatively non-polar, hydrophobic monomers such as ethylene and/or propylene, the polar group of these monomers will preferentially bloom to the surface of the copolymer during polymerization, and the resulting spun microfibers will have polar groups on the surfaces thereof In a particularly advantageous form, the copolymer can be an ionomer. The term "ionomer" or "ionomer resin" means an extrudable resin comprising repeating units of both electrically neutral repeating units, such as ethylene or propylene, among others, and a fraction of ionized units (usually no more than 15 mole percent) covalently bonded to the polymer backbone as pendant group moieties. Examples of ionomers include the Iotek family of polymers formerly available from Exxon Mobil Corporation. These polymers were ethylene/methacrylic acid copolymers. Other ionomers may be commercially available, including Surlyn® family of ionomers from the DuPont™ Corporation, which are also ethylene/methacrylic acid copolymers. Ionomers from this family that may be useful in embodiments include the 9xxx series that are crosslinked with zinc ions, among others.

In various example, the ionomers can be ionically cross-linked by neutralizing at least a part of a carboxyl group in an ethylene/unsaturated carboxylic acid copolymer, such as cross-linked ethylene-methacrylic acid and ethylene-acrylic acid copolymers, with a cationic species, such as $Ca^{++}$, $Mg^{++}$, $Mn^{++}$, $Co^{++}$, $Ni^{++}$, $Zn^{++}$ and $Pb^{++}$, or the like.

It is possible that there may be no single fiber composition that will adequately reinforce cementitious compositions against microscopic cracking at all use temperatures, but an ensemble of materials with varying thermal properties could span the range. In this regard, the present disclosure is directed to a cementitious mixture, comprising a mineral cement and microfibers which comprise a first population of microfibers formed from at least a first synthetic, low-crystallinity copolymer and a second population of microfibers formed from a second synthetic, low-crystallinity copolymer, different from said first copolymer, wherein monomers forming said different copolymers are selected to provide different physical characteristics to each of said different synthetic, low-crystallinity copolymers. Each "population" of microfibers includes a collection of microfibers which can have substantially the same diameters and aspect ratios, but are spun from different low-crystallinity copolymers. Alternatively, the at least two populations of microfibers can be selected to have different physical characteristics.

For example, the different populations of microfibers can be selected to have differing diameters and aspect ratios, and/or differing thermal characteristics, such as differing softening temperatures, and/or differing crystallinities, and/or differing tensile strengths or ductilities and/or differing stiffnesses. In this way the ultimate cured cementitious composition can be engineered to have enhanced resistance to microscopic cracking at different temperatures, such as is encountered by vehicular roadways during different times of day and different seasons of the year, as compared to cementitious compositions having only a single population of microfibers. Instead, by utilizing at least two different microfiber populations, the combined thermal and strength characteristics of the microfibers in each population can be optimized for different temperature ranges, such as by modifying the monomer components and/or concentrations of each population, or by varying the microfiber diameters and/or aspect ratios.

Accordingly, it can be advantageous if the first synthetic, low-crystallinity copolymer and the second synthetic, low-crystallinity copolymer have Vicat softening temperatures which differ by at least about 10° C., such as where a first synthetic, low-crystallinity copolymer has a Vicat softening temperature of from about −20 to about 0° C., and a second synthetic, low-crystallinity copolymer has a Vicat softening temperature of from about 20° C. to about 40° C.

As described, the maximum tensile stress is the best indicator of energy consumed. Polymers that may be used may have a maximum tensile stress of about 15 MPa, about 12 MPa, about 10 MPa, about 8 MPa, about 6 MPa, or about 4 MPa. A higher value may be more desirable. Similarly, the comparison of the maximum tensile stress with the elongation at break represents the energy dissipated in a tension test. As an example, Vistamaxx™ grade 3588FL has a maximum tensile stress of 11.3 MPa at an elongation of 637%.

Further, in some examples, the different synthetic copolymers have different strain-hardening capacities as measured by the comparison of the maximum tensile stress for each polymer attainable after ductile drawing. For example, the percentage ratio of the maximum tensile stress of a stronger polymer may be about 10% higher than a lower strength polymer indicating a higher strain hardening capacity. In other examples, the maximum tensile stress of a stronger polymer may be about 20% higher, about 40% higher, about 50% higher, or more. In some examples, a softening temperature is defined as the highest temperature where substantial strain-hardening is observed, i.e., the maximum tensile stress is greater than the ductile flow stress. However, in some examples, each population of microfibers has maximum tensile stress at a given temperature differing by over 50%, even if each is roughly equivalent when tested at its respective softening temperature.

Additionally, the microfiber characteristics can be optimized by including microfiber populations in which the synthetic, low-crystallinity copolymers of the microfibers each have different crystallinities in ranges from about 1% to about 60%, even from about 5% to about 45%, or even from about 10% to about 30%, as measured by Differential Scanning calorimetry, by varying the ratio of the ethylene and propylene co-monomers or other backbone defects such as tacticity or branching.

In some examples, the monomer composition of the fibers is selected to include cross-linkable components, such as non-conjugated dienes, alkoxysilanes, vinyl sulfonyls, or other such cross-linkable groups. In this manner the microfibers can be lightly cross-linked after formation of the microfibers to improve their toughness, prior to mixing into a wet or dry cementitious composition. The cross-linkable groups can be either those which can be cross-linked by radiation, such as ultraviolet radiation or heat in the presence of an oxidizing agent. In some examples, external compounds are added to generate cross-links during production of the microfibers, such as peroxides or the like. Measuring cross-link density can be performed by solvent swelling to measure volume gain, or by dynamic mechanical analysis (DMA) to measure storage modulus.

In one example, the Vistamaxx™ grade 3588FL, described herein, with a high crystallinity as indicated by yield strength, stiffness, and a low-ethylene content (about 4 wt. %) is used for at least one of the microfibers. The microfibers are then lightly crosslinked. This imparts both high viscosity and some resistance to degradation from the local environment. Further, at high temperatures, such as in a road surface in the summer, the microfibers may have lost much of their strength due to softening. Cross-linking or high viscosity may limit damage to the microfibers such that they continue functioning under a wide variety of conditions. In the absence of crosslinks, a very high molecular weight copolymer may suffice.

An additional form of the presently disclosed disclosure is directed to a process for reinforcing a cementitious matrix, comprising adding microfibers comprising one or more synthetic, low-crystallinity copolymers to a cementitious premixture containing a mineral cement.

As described above, it can be particularly advantageous if the microfibers comprise at least a first population of microfibers formed from a first synthetic, low-crystallinity copolymer and a second population of microfibers formed from a second synthetic, low-crystallinity copolymer, different from said first copolymer, the monomers of each different copolymer being selected to provide different physical characteristics to each of said different synthetic, low-crystallinity copolymers. In this way the cementitious compositions can be optimized to have different microfibers made of different synthetic, low-crystallinity copolymers which have different thermal characteristics, such as different softening temperatures, different ductilities, different tensile strengths, and the like.

While the present disclosure has been described and illustrated by reference to particular forms, those of ordinary skill in the art will appreciate that the disclosure lends itself to variations not necessarily illustrated herein. For this reason, then, reference should be made solely to the appended claims for purposes of determining the true scope of the present disclosure.

The invention claimed is:

1. A cementitious mixture comprising:
a mineral cement; and
a first population of microfibers comprising a first synthetic copolymer comprising from about 1 mol. % to about 25 mol. % of ethylene monomeric units and from about 75 mol. % to about 99.5 mol. % of propylene monomeric units, and a second synthetic copolymer comprising a polyethylene comprising between about 0.5 mol. % and about 5 mol. % of a comonomer, wherein the comonomer comprises 1-butene, 1-hexene, or 1-octene, or any combinations thereof.

2. The cementitious mixture of claim 1, comprising a second population of microfibers comprising a third synthetic copolymer, comprising from about 1 mol. % to about 25 mol. % of one of ethylene or propylene monomeric units, and from about 75 mol. % to about 99.5 mol. % of the other of propylene or ethylene monomeric units.

3. The cementitious mixture of claim 1, comprising a second population of microfibers comprising a fourth synthetic copolymer, comprising from about 1 mol. % to about 25 mol. % of ethylene monomeric units and from about 75 mol. % to about 99.5 mol. % of propylene monomeric units.

4. The cementitious mixture of claim 1, wherein the first synthetic copolymer comprises between about 0.2 mol. % and about 5 mol. % of a diene monomer.

5. The cementitious mixture of claim 4, wherein the diene monomer comprises dicyclopentadiene, norbornene, vinyl norbornene, or any combinations thereof.

6. The cementitious mixture of claim 2, wherein the first population of microfibers, the second population of microfibers, or both, is cross-linked by being subjected to radiation.

7. The cementitious mixture of claim 1, wherein the first population of microfibers have exposed polar groups having chemical affinity with minerals present in curing or cured cementitious mixtures.

8. The cementitious mixture of claim 1, wherein the first population of microfibers has diameters of less than about 1 mm and aspect ratios from about 5:1 to about 50:1.

9. The cementitious mixture of claim 1, further comprising one or more of sand, fly ash, fine aggregates, coarse aggregates, blast furnace slag, pozzolans, fumed silica, wetting agents, air entrainers, air detrainers, corrosion inhibitors, set accelerators set retarders, or any combinations thereof.

10. The cementitious mixture of claim 1, wherein the at least one of the first synthetic copolymer or the second synthetic copolymer of the first population of microfibers has a crystallinity of from about 1% to about 60%.

11. The cementitious mixture of claim 1, wherein at least one of the first synthetic copolymer or the second synthetic copolymer used in the first population of microfibers has a ductility greater than about 50%, as measured by strain to failure.

12. The cementitious mixture of claim 1, wherein at least one of the first synthetic copolymer and the second synthetic copolymer comprises repeating units of at least two different monomer compounds, wherein one of the monomer compounds comprises polar groups.

13. The cementitious mixture of claim 12, wherein the monomer compounds having the polar groups that are derived from alpha, beta-unsaturated carboxylic acids or anhydrides, unsaturated organic sulfonic acids, or their salts or ester derivatives.

14. The cementitious mixture of claim 2, wherein at least one of the first synthetic copolymer, the second synthetic copolymer, or the third synthetic copolymer is an ionomer.

15. The cementitious mixture of claim 2, wherein the first synthetic copolymer and the third synthetic copolymer have a different Vicat softening temperature.

16. The cementitious mixture of claim 2, wherein the first synthetic copolymer and the third synthetic copolymer have Vicat softening temperatures which differ by at least about 10° C.

17. The cementitious mixture of claim 2, wherein the first synthetic copolymer and the third synthetic copolymer have a different ductility.

18. The cementitious mixture of claim 17, wherein each of the ductilities are greater than about 50%.

19. The cementitious mixture of claim 2, wherein the first synthetic copolymer and the third synthetic copolymer each have a crystallinity of from about 1% to about 60%.

20. The cementitious mixture of claim 1, comprising a wet or a dry mixture.

21. The cementitious mixture of claim 1, comprising a cured concrete.

22. A process for reinforcing a cementitious matrix, comprising adding a first population of microfibers to a mineral cement to form a cementitious premixture, wherein the first population of microfibers comprises a first synthetic copolymer, comprising from about 1 mol. % to about 25 mol. % of ethylene monomeric units and from about 75 mol. % to about 99.5 mol. % of propylene monomeric units, wherein the first population of microfibers have diameters of less than about 1 mm and aspect ratios from about 5:1 to about 50:1.

23. The process of claim 22, comprising adding a second population of microfibers to the cementitious premixture, wherein the second population of microfibers comprises a second synthetic copolymer, comprising from about 1 mol. % to about 25 mol. % of one of ethylene or propylene monomeric units, and from about 75 mol. % to about 99.5 mol. % of the other of propylene or ethylene monomeric units.

24. The process of claim 22, wherein at least one of the first population of microfibers or the second population of microfibers comprise exposed polar groups having chemical affinity with minerals present in curing cementitious mixtures.

25. The process of claim 22, wherein at least one of the first population of microfibers or the second population of microfibers is lightly cross-linked by being subjected to radiation.

26. The process of claim 22, further comprising adding one or more of sand, fly ash, fine aggregates, coarse aggregates, blast furnace slag, pozzolans, fumed silica, wetting agents, air entrainers, air detrainers, corrosion inhibitors, set accelerators, set retarders, or any combinations thereof, to the cementitious premixture.

27. The process of claim 22, wherein the cementitious premixture is a wet or a dry mixture.

28. A cementitious mixture comprising:
a mineral cement;
a first population of microfibers comprising a first synthetic copolymer comprising from about 1 mol. % to about 25 mol. % of ethylene monomeric units and from about 75 mol. % to about 99.5 mol. % of propylene monomeric units, and a second synthetic copolymer comprising a polyethylene comprising between about 0.5 mol. % and about 5 mol. % of a comonomer, wherein the comonomer comprises 1-butene, 1-hexene, or 1-octene, or any combinations thereof; and a second population of microfibers comprising a third synthetic copolymer, comprising from about 1 mol. % to about 25 mol. % of one of ethylene or propylene monomeric units, and from about 75 mol. % to about 99.5 mol. % of the other of propylene or ethylene monomeric units.

29. The cementitious mixture of claim 28, wherein the second population of microfibers comprises a fourth synthetic copolymer comprising a polyethylene comprising between about 0.5 mol. % and about 5 mol. % of a comonomer, wherein the comonomer comprises 1-butene, 1-hexene, 1-octene, or any combinations thereof.

30. The cementitious mixture of claim 28, wherein the first synthetic copolymer, the third synthetic copolymer, or both, comprises between about 0.2 mol. % and about 5 mol. % of a diene monomer.

31. The cementitious mixture of claim 30, wherein the diene monomer comprises dicyclopentadiene, norbornene, vinyl norbornene, or any combinations thereof.

32. The cementitious mixture of claim 28, wherein the first population of microfibers, the second population of microfibers, or both, is cross-linked by being subjected to radiation.

33. The cementitious mixture of claim 28, wherein the first population of microfibers, the second population of microfibers, or both, have exposed polar groups having chemical affinity with minerals present in curing or cured cementitious mixtures.

34. The cementitious mixture of claim 28, wherein the first population of microfibers, the second population of microfibers, or both, have diameters of less than about 1 millimeter and aspect ratios from about 5:1 to about 50:1.

35. The cementitious mixture of claim 28, wherein the first synthetic copolymer, the third synthetic copolymer, or both, has a crystallinity of from about 1% to about 60%.

* * * * *